US008995803B2

United States Patent
Bickham et al.

(10) Patent No.: US 8,995,803 B2
(45) Date of Patent: Mar. 31, 2015

(54) MODE DELAY MANAGED FEW MODED OPTICAL FIBER LINK

(71) Applicants: Scott Robertson Bickham, Corning, NY (US); Ming-Jun Li, Horseheads, NY (US); Shenping Li, Painted Post, NY (US); Sergey Yurevich Ten, Horseheads, NY (US)

(72) Inventors: Scott Robertson Bickham, Corning, NY (US); Ming-Jun Li, Horseheads, NY (US); Shenping Li, Painted Post, NY (US); Sergey Yurevich Ten, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/759,198

(22) Filed: Feb. 5, 2013

(65) Prior Publication Data

US 2013/0216181 A1 Aug. 22, 2013

Related U.S. Application Data

(60) Provisional application No. 61/600,828, filed on Feb. 20, 2012, provisional application No. 61/600,700, filed on Feb. 19, 2012.

(51) Int. Cl.
| | |
|---|---|
| *G02B 6/00* | (2006.01) |
| *G02B 6/26* | (2006.01) |
| *G02B 6/028* | (2006.01) |
| *G02B 6/036* | (2006.01) |

(52) U.S. Cl.
CPC ............. *G02B 6/268* (2013.01); *G02B 6/0288* (2013.01); *G02B 6/0365* (2013.01)
USPC .............................................. 385/28; 385/27

(58) Field of Classification Search
USPC ....................................................... 385/27, 28
See application file for complete search history.

(56) References Cited

U.S. PATENT DOCUMENTS

| | | | |
|---|---|---|---|
| 5,613,028 A * | 3/1997 | Antos et al. ................... 385/123 |
| 5,903,683 A * | 5/1999 | Lowry ............................... 385/1 |
| 6,418,256 B1 | 7/2002 | Danziger et al. | |
| 6,430,347 B1 * | 8/2002 | Cain et al. ..................... 385/123 |
| 6,614,961 B2 | 9/2003 | Kim et al. | |
| 6,798,962 B2 | 9/2004 | Berkey et al. | |
| 6,810,185 B2 | 10/2004 | Qi et al. | |
| 6,859,568 B2 * | 2/2005 | Noe et al. .......................... 385/11 |
| 6,901,196 B2 | 5/2005 | Takahashi et al. | |
| 7,187,833 B2 | 3/2007 | Mishra | |

(Continued)

OTHER PUBLICATIONS

Jeunhomme, Luc B., "Single Mode Fiber Optics," p. 39, 44, Marcel Dekker, New York 1990.

(Continued)

*Primary Examiner* — Kaveh Kianni
(74) *Attorney, Agent, or Firm* — Robert L Carlson

(57) ABSTRACT

An optical fiber link suitable for use in a mode division multiplexing (MDM) optical transmission system is disclosed. The link has a first optical fiber having a core which supports the propagation and transmission of an optical signal with X LP modes at a wavelength of 1550 nm, wherein X is an integer greater than 1 and less than or equal to 20, the first fiber having a positive differential mode group delay between the LP01 and LP11 modes at a wavelength between 1530-1570. The link also has a second optical fiber having a core which supports the propagation and transmission of an optical signal with Y LP modes at a wavelength of 1550 nm, wherein Y is an integer greater than 1 and less than or equal to 20, said optical fiber having a negative differential mode group delay between the LP01 and LP11 modes at a wavelength between 1530-1570.

15 Claims, 5 Drawing Sheets

(56) References Cited

U.S. PATENT DOCUMENTS

| | | |
|---|---|---|
| 7,406,237 B2 | 7/2008 | Bickham et al. |
| 7,574,088 B2 | 8/2009 | Sugizaki et al. |
| 7,853,110 B2 | 12/2010 | Bickham et al. |
| 7,865,050 B1 | 1/2011 | Sun |
| 2012/0294576 A1 | 11/2012 | Li |
| 2012/0328255 A1 | 12/2012 | Bickham |
| 2013/0071114 A1* | 3/2013 | Bickham et al. ............ 398/44 |
| 2013/0216181 A1* | 8/2013 | Bickham et al. ............ 385/28 |

OTHER PUBLICATIONS

Lenahan, T.A., "Calculation of Modes in an Optical Fiber Using a Finite Element Method and EISPACK," Bell Syst. Tech. J., vol. 62, No. 1, p. 2663, Feb. 1983.

Donlagic, Denis, "Opportunities to Enhance Multimode Fiber Links by Application of Overfilled Launch," Journal of Lightwave Technology, vol. 23, No. 11, p. 3526-3539, Nov. 2005.

Kubota, Hirokazu, "Intermodal Group Velocity Dispersion of Few-Mode Fiber," IEICE Electronics Express, vol. 7, No. 20, p. 1552-1556.

Li, An, "Reception of Mode and Polarization Multiplexed 107-Gb/s CO-OFDM Signal over a Two-Mode Fiber," Optical Society of America/OFC/NFOEC 2011.

Ryf, R., "Space-Division Multiplexing Over 10 km of Three-Mode Fiber Using Coherent 6×6 MIMO Processing," Optical Society of America, OSA/OFC/NFOEC 2011.

Salsi, Massimiliano, Transmission at 2×100Gb/s, Over Two Modes of 40 km-long Prototype Few-Mode Fiber, Using LCOS-based Mode Multiplexer and Demultiplexer, Optical Society of America, OSA/OFC/NFOEC 2011.

International Search Report issued Oct. 9, 2012 in counterpart application No. PCT/12/049289.

Bourdine, Anton V., "Simulation of a Few-Mode Signal Propagation Over Multimode Fiber Link with Differential Mode Delay Compensators," Proceedings of SPIE, vol. 7523, Dec. 3, 2009, p. 752305.

Li, Ming-Jun, "Low Delay and Large Effective Area Few-Mode Fibers for Mode-Division Multiplexing," Opto-Electronics and Communications Conference OECC, 2012, $17^{th}$, IEEE, Jul. 2, 2012, pp. 495-496.

Gruner-Nielsen, Lars, "Few Mode Transmission Fiber with Low DGD, Low Mode Coupling, and Low Loss," Journal of Lightwave Technology, IEEE Service Center, New York, NY, US, vol. 30, No. 23, Dec. 1, 2012, pp. 3693-3698.

PCT Search Report, May 31, 2013, PCT/US2013/025880.

* cited by examiner

MODE DELAY MANAGED FEW MODED OPTICAL FIBER LINK

CROSS-REFERENCE TO RELATED APPLICATIONS

This application claims the benefit of priority under 35 U.S.C. §119 of U.S. Provisional Application Ser. No. 61/600,828 filed on Feb. 20, 2012, the content of which is relied upon and incorporated herein by reference in its entirety as well as claiming the benefit of priority under 35 U.S.C. §119 of U.S. Provisional Application Ser. No. 61/610,700 filed on Mar. 14, 2012, the content of which is relied upon and incorporated herein by reference in its entirety.

FIELD

The present specification generally relates to optical fibers and more specifically to fiber links employing few moded optical fibers.

BACKGROUND

The explosive growth in the volume and variety of multimedia telecommunication applications continues to drive speed demands for internet traffic and motivate research in backbone fiber-optic communication links. Coherent communications and electronic digital signal processing (DSP)-based receivers have been accepted in recent years as the next-generation standards for long-haul systems due to their flexibility, scalability and ability to compensate for various transmission impairments, including fiber nonlinearity. As fiber nonlinearity places a limit on achievable spectral efficiency, large effective-area ($A_{eff}$) single-mode fibers (SMFs) have been designed for reducing nonlinearity penalties.

However, the spectral efficiency of an optical fiber increases slowly with increasing effective area, so another solution is needed to increase system capacity.

SUMMARY

One aspect of the disclosure is an optical fiber link which comprises a first optical fiber having a core which supports the propagation and transmission of an optical signal with X linearly polarized (LP) modes at a wavelength of 1550 nm, wherein X is an integer greater than 1 and less than or equal to 20, said optical fiber having a positive differential mode group delay between the LP01 and LP11 modes at a wavelength between 1530-1570; and a second optical fiber having a core which supports the propagation and transmission of an optical signal with Y LP modes at a wavelength of 1550 nm, wherein Y is an integer greater than 1 and less than or equal to 20, said optical fiber having a negative differential mode group delay between the LP01 and LP11 modes at a wavelength between 1530-1570. The first and second fibers are preferably few moded fibers. The lengths of the first and second fibers may be selected to result in an absolute value of differential mode group delay between the LP01 and LP11 modes over the optical fiber link that is less than about 1.0, more preferably less than about 0.5, even more preferably less than about 0.25, and even more preferably less than about 0.1 ns/km at a wavelength of 1550 nm. Additionally, if desired, the design of the first and second fibers, and the lengths of the first and second fibers may be selected to result in an absolute value of differential mode group delay between the LP01 and LP11 modes over the link that is less than about 1.0, more preferably less than about 0.5, even more preferably less than about 0.25, and even more preferably less than about 0.1 ns/km at every wavelength over the entire wavelength range between 1530 to 1570 nm. These results are achievable even over optical fiber link lengths that extend a distance greater than 50, more preferably greater than 100, even more preferably greater than 500, and even more preferably greater than 1000 km.

In some embodiments, the first and second fibers may also be designed so that the first fiber exhibits a positive differential mode group delay slope over the wavelength range of 1530 to 1570 nm, and the second fiber comprises a negative differential mode group delay slope over the wavelength range of 1530 to 1570 nm. In other embodiments, the first and second fibers may also be designed so that the first fiber exhibits a negative differential mode group delay slope over the wavelength range of 1530 to 1570 nm, and the second fiber comprises a positive differential mode group delay slope over the wavelength range of 1530 to 1570 nm. In both types of embodiments, the lengths for each of said first and second fibers may then be selected to result in absolute value of group delay slope between the LP01 and LP11 modes over the link that is less than about 1.0, more preferably less than 0.5, even more preferably less than 0.25, and even more preferably less than 0.1 ps/nm/km over the wavelength range of 1530 to 1570 nm. These results are achievable even over optical fiber link lengths that extend a distance greater than 50 km, more preferably greater than 100 km, even more preferably greater than 500 km, and even more preferably greater than 1000 km.

Additional features and advantages of the disclosure are set forth in the detailed description that follows, and in part will be readily apparent to those skilled in the art from that description or recognized by practicing the embodiments described herein, including the detailed description that follows, the claims, as well as the appended drawings. The claims are incorporated into and constitute part of the Detailed Description as set forth below.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
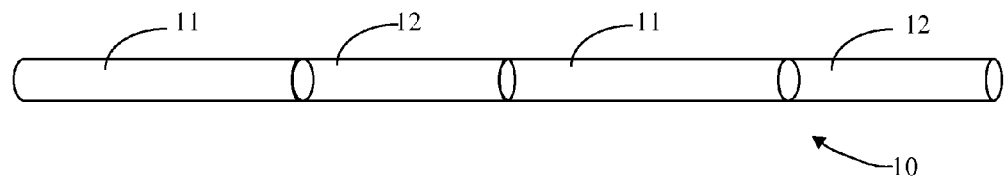
FIG. 1 a side view of a section of a delay managed few moded optical fiber link according embodiments described herein.

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to described the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," as used herein, is defined as:

$$\Delta(r)\% = 100 \times [n(r)^2 - n_{REF}^2]/2n(r)^2,$$

where $n(r)$ is the refractive index at radius r, unless otherwise specified. The relative refractive index is defined at 1550 nm unless otherwise specified. The reference index $n_{REF}$ is the refractive index of the cladding, which in preferred embodiments comprises pure silica with a refractive index of about 1.444 at 1550 nm. As used herein, the relative refractive index is represented by $\Delta$ and its values are given in units of "%", unless otherwise specified. In cases where the refractive index of a region is less than the reference index $n_{REF}$, the relative refractive index is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative refractive index is positive and the region can be said to be raised or to have a positive index.

As used herein, the "effective area" $A_{eff}$ of an optical fiber is the area of the optical fiber in which light is propagated and is defined as:

$$A_{eff} = 2\pi \frac{\left(\int_0^\infty E^2 r \, dr\right)^2}{\int_0^\infty E^4 r \, dr},$$

where E is the electric field associated with light propagated in the fiber and r is the radius of the fiber. The effective area $A_{eff}$ is determined for the LP01 mode at a wavelength of 1550 nm, unless otherwise specified.

Mode field diameter (MFD) is a measure of the spot size or beam width of light propagating in a single mode fiber. The MFD is a function of the source wavelength, fiber core radius and fiber refractive index profile. The MFD is measured using the Peterman II method, where:

$$MFD = 2w, \text{ and}$$

$$w^2 = 2 \frac{\int_0^\infty E^2 r \, dr}{\int_0^\infty (dE/dr)^2 r \, dr}$$

wherein E is the electric field distribution in the fiber and r is the radius of the fiber. The MFD is determined for the LP01 mode at a wavelength of 1550 nm, unless otherwise specified.

Chromatic dispersion or dispersion of a fiber is the sum of the material dispersion, the waveguide dispersion, and the inter-modal dispersion.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. In single mode fibers, the highest cutoff wavelength typically corresponds to the cutoff wavelength of the LP11 mode. In a few-moded fiber that propagates X LP modes at wavelength $\lambda$, all X LP modes have cutoff wavelengths that are greater than $\lambda$. A mathematical definition of the cutoff wavelength can be found in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective cutoff wavelength of a cabled fiber is lower than the theoretical cutoff wavelength and is approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test. The cabled cutoff wavelength for any LP mode is typically 100 to 300 nm lower than the theoretical cutoff wavelength.

As used herein, the term "few moded fiber" refers to a fiber supporting the propagation of more modes than a single mode fiber but fewer modes than a normal multimode fiber. The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983). Light travelling in an optical fiber or other dielectric waveguide forms hybrid-type modes, which are usually referred to as LP (linear polarized) modes. The LP0p modes have two polarization degrees of freedom and are two-fold degenerate, the LP1p modes are four-fold degenerate and the LPmp modes with m>1 are four-fold degenerate. We do not include these degeneracies when we designate the number of LP modes propagating in the fiber. For example, an optical fiber in which only the LP01 mode propagates is a single-mode fiber, even though the LP01 mode has two possible polarizations. A few-moded optical fiber in which the LP01 and LP11 modes propagate supports three spatial modes since the LP11 mode is two-fold degenerate, and each mode also has two possible polarizations, giving a total of 6 modes. Thus, when a fiber is said to have two LP modes, it is meant that it supports the propagation of all of the LP01 modes and LP11 modes.

As used herein, the term "optical fiber link" refers to at least two fibers which are different in some aspect, e.g. refractive index profile, core radius, or optical property, the two fibers being attached in communication with one another so that together they support the propagation of more than one LP mode. In this few moded fiber system, preferably at least one of the at least two fibers supports the propagation of X LP modes, wherein X is an integer greater than 1 and less than or equal to 20, and another of the at least two fibers supports the propagation of Y LP modes, wherein Y is an integer greater than 1 and less than or equal to 20. In some preferred embodiments, X=Y.

The term "α-profile" or "alpha profile," as used herein, refers to a relative refractive index profile, expressed in terms of Δ which is in units of "%", where r is the radius and which follows the equation:

$$\Delta = \Delta_0 \left[ 1 - \left( \frac{r}{r_0} \right)^\alpha \right],$$

where $\Delta_0$ is the maximum relative refractive index, $r_0$ is the radius of the core, r is in the range $r_i \leq r \leq r_f$, Δ is as defined above, $r_i$ is the initial point of the α-profile, $r_f$ is the final point of the α-profile, and α is a real number exponent. For a step index profile, the alpha value is greater than or equal to 10. For a graded index profile, the alpha value is less than 10. The term "parabolic," as used herein, includes substantially parabolically shaped refractive index profiles with α=2 as well as profiles in which the curvature of the core varies slightly from α=2 at one or more points in the core, e.g. profiles having a centerline dip. It is noted here that different forms for the core radius and maximum relative refractive index are used in the examples below without affecting the fundamental definition of delta (Δ).

Unless otherwise specified herein, the above-referenced properties of the optical fiber disclosed herein and discussed below are modeled or measured at 1550 nm.

In the discussion below, any portion of the optical fiber that is not the core is considered part of the cladding. Also, the relative refractive index of a given region Y of fiber 10 is described generally as a function of radius $\Delta_Y(r)$, and in certain cases can have a maximum $\Delta_{YMAX}$ and/or a minimum $\Delta_{YMIN}$. In examples where $\Delta_Y(r)$ is constant, then $\Delta_Y(r) = \Delta_{YMAX} = \Delta_{YMIN}$ and is referred to as $\Delta_Y$.

FIG. 1 shows a schematic of an optical fiber link 10 employing differential mode group delay compensation. In FIG. 1, fiber link 10 includes at least two few mode fibers 11 and 12, one having positive differential mode group delay, and the other one having negative differential mode group delay. The various example embodiments of fiber link 10 and optical fibers 11 and 12 are now described below. It is possible to transmit signals in more than one spatial propagation mode of a few mode fiber (FMF) using multiple-input multiple-output (MIMO) techniques. Few mode fibers are particularly attractive for this application because the computational complexity directly scales with number of modes, and utilizing only a few modes reduces the risk of modal mixing that can lead to bit error rate penalties from multipath interference (MPI). Few moded optical fibers previously proposed for optical fiber communications systems have either step index or parabolic cores, which support the propagation of the LP11 modes in addition to the fundamental LP01 mode. With previous designs, there are large delay differences between the fundamental LP01 mode and the LP11 mode at one or more wavelengths in the 1550 nm window. These large delay differences make it difficult to demultiplex the optical signals in the time domain using MIMO. The embodiments disclosed herein solve this challenge.

The differential mode group delay of a higher order mode $LP_{mn}$ relative to the fundamental LP01 mode is defined as:

$$\Delta \tau_{mn} = \tau_{mn} - \tau_{01}$$

If $\Delta \tau_{mn}$ is positive, the fiber is said to have a positive differential mode group delay, and if $\Delta \tau_{mn}$ is negative, the fiber is said to have a negative differential mode group delay.

Unless otherwise stated, as used herein differential mode delay refers to the delay between the LP01 and the LP11 modes. The slope of the differential mode group delay of the optical fiber is defined as:

$$s_{mn} = \frac{d(\Delta \tau_{mn})}{d\lambda}$$

Unless otherwise stated, as used herein differential mode delay slope refers to the delay slope between the LP01 and the LP11 modes.

To compensate for the differential mode group delay in a broad wavelength band, both the differential mode group delay and the slopes of the differential mode group delay of the two fibers are preferably of opposite sign with respect to one another. By designing the two fibers to have proper differential mode group delays, differential mode group delay slopes and selecting appropriate fiber lengths, a fiber link with very low differential mode group delay can be constructed. For example, using the methods disclosed herein, differential mode group delay compensated optical fiber links can be assembled which exhibit an absolute value of net differential mode group delay between the LP01 and LP11 modes over the optical fiber link 10 that is less than about 0.5 ns/km, more preferably less than 0.25 ns/km, even more preferably less than 50 ps/km, even more preferably less than 10 ps/km, even more preferably less than 5 ps/km in a WDM wavelength band, for example from 1530 nm to 1570 nm, and particularly at a wavelength of 1550 nm.

Figure 2A:
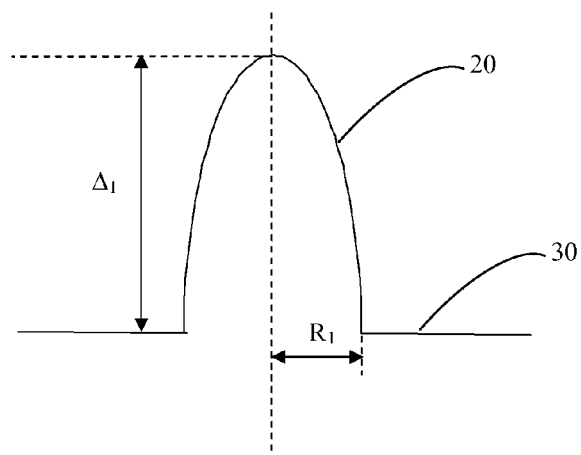
FIG. 2A illustrates a refractive index profile of a few moded fiber.

The optical fiber differential mode group delay and the slope of the differential mode group delay can be modified to be positive or negative by altering the optical fiber refractive index profile designs, e.g by altering the alpha of the core or the radii of the core. FIG. 2(a) illustrates a schematic of index profile of an optical fiber which utilizes a simple graded or gradient index alpha profile design. The example in FIG. 2A has a core 20 and a cladding 30 surrounding the core. The core delta $\Delta_1$ is in the range of 0.3 to 0.8%, more preferably between 0.3 and 0.6%. The core radius $R_1$ is between 6 to 22 µm, more preferably between 8 and 20 µm, and even more preferably between 10 and 20 µm. The index change in the core can be described by an alpha function:

$$\Delta = \Delta_0 \left[ 1 - \left( \frac{r}{r_0} \right)^\alpha \right]$$

An alpha of one corresponds to a triangular profile, and alpha of 2 describes a parabolic profile. When alpha is greater than 20, the profile is practically a step index profile.

Figure 2B:
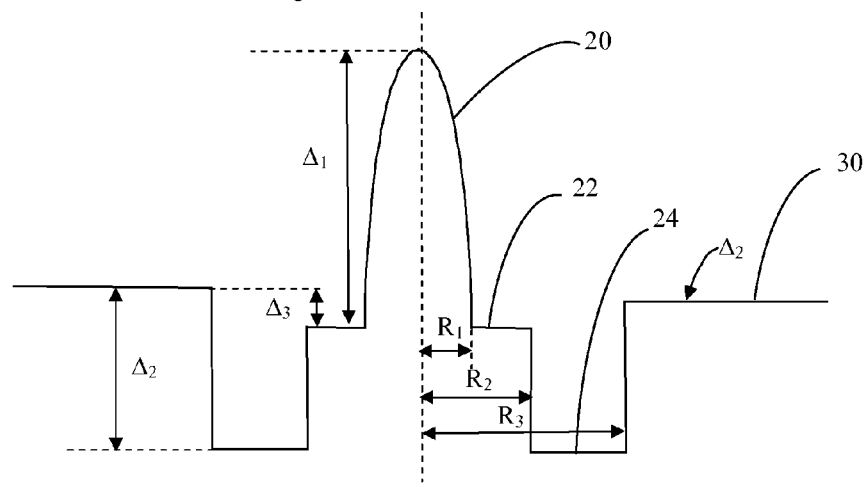
FIG. 2B illustrates a refractive index profile of an alternative few moded fiber.

To control the number of modes, to alter the mode group delays and to improve the bending loss, an inner cladding 22, and low index trench region 24, and an updoped cladding 30 can be added to the simple core design of fibers 11 and/or 12 as shown in FIG. 2(b). In the embodiment illustrated, the inner cladding region 22 has an index difference of $\Delta_3$ relative to the outer cladding $\Delta_3$ is between −0.1 to 0.05%. The low index trench 24 is placed next to the inner cladding with a starting radius of $R_2$ and an ending radius of $R_3$. The low index trench has an index change of $\Delta_2$, and a ring width of $R_3-R_2$. Preferably $\Delta_2$ is between −0.1 and −0.7%, more preferably between −0.2 and −0.5%. The width of trench 24 is preferably between 2 to 8 µm, more preferably between 3 to 6 µm. In some embodiments, the trench 24 is adjacent to the core, wherein $R_2-R_1<0.5$ µm. In other embodiments, the trench is spaced from the core, wherein 0.5 µm>$R_2-R_1$>10 µm. In addition, while the trench 24 is shown as being rectangular, it can also be of other shapes like triangular or parabolic for additional mode-field control in the fiber design.

In some embodiments, the first fiber 11 may be comprised of graded index core refractive profile characterized by curvature $\alpha_1$, and the second fiber may be comprised of a graded index core refractive profile characterized by curvature $\alpha_2$, wherein $|\alpha_1-\alpha_2|$>0.2 and $\alpha_1$ and $\alpha_2$ are both between 1.5 and 3.0. In some alternative embodiments, the first fiber may be comprised of a graded index core refractive profile characterized by curvature $\alpha_i$ and radius $R_{1i}$, and the second fiber may be comprised of a graded index core refractive profile characterized by $\alpha_j$ and radius $R_{1j}$, and $|\alpha_i-\alpha_j|$<0.4 and $|R_{1i}-R_{1j}|$>0.1 µm, and more preferably $|\alpha_i-\alpha_j|$<0.2 and $|R_{1i}-R_{1j}|$>0.2 µm. In some alternative embodiments, the first fiber may be comprised of a graded index core refractive profile characterized by curvature $\alpha_i$, and the second fiber may be comprised of a graded index core refractive profile characterized by curvature $\alpha_j$, wherein $\alpha_i$>2.0, and $\alpha_j$<2.0.

Figure 3:
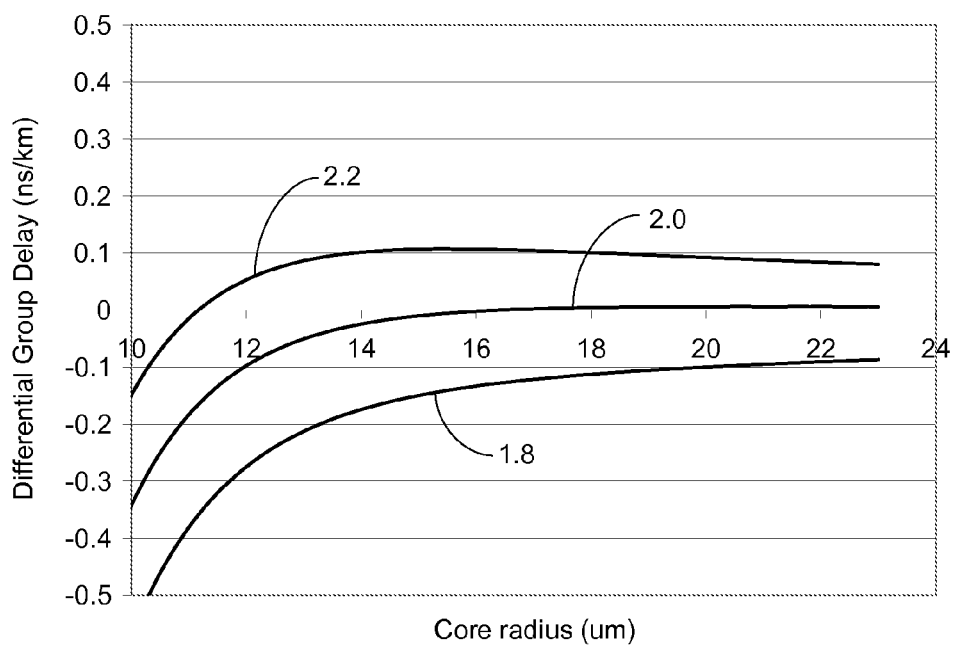
FIG. 3 illustrates differential mode group delay as a function of core radius for several optical fibers having different core alphas.
Figure 4:
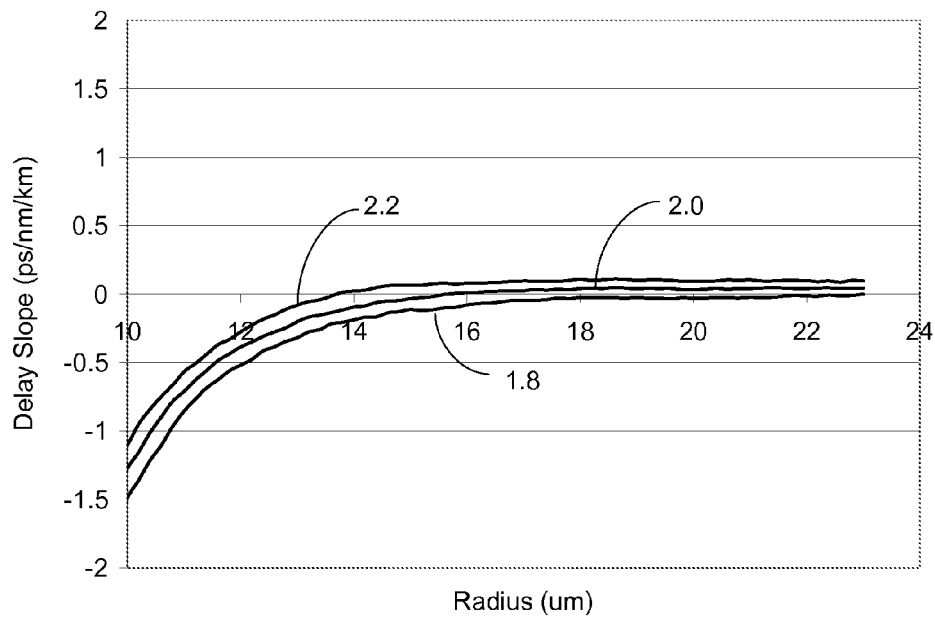
FIG. 4 illustrates mode group delay slope as a function of core radius for several optical fibers having different core alphas.

By changing the core profile design, both positive and negative delays can be realized. FIG. 3 shows differential group delays as a function of core radius for three modeled alpha profiles whose alpha values are 1.8, 2.0, and 2.2. For all the three profiles, the core delta $\Delta_1$ is 0.5%. As shown in FIG. 3, by changing either or both of the alpha value and core radius, the differential group delay can be made to be positive, negative, or zero. FIG. 4 plots the slope of the differential mode group delay as a function of core radius for the three alpha profiles having alpha values of 1.8, 2.0 and 2.2. As shown in FIG. 4, positive, negative, or zero differential mode delay slopes can be designed by choosing the appropriate profile parameters.

Figure 5:
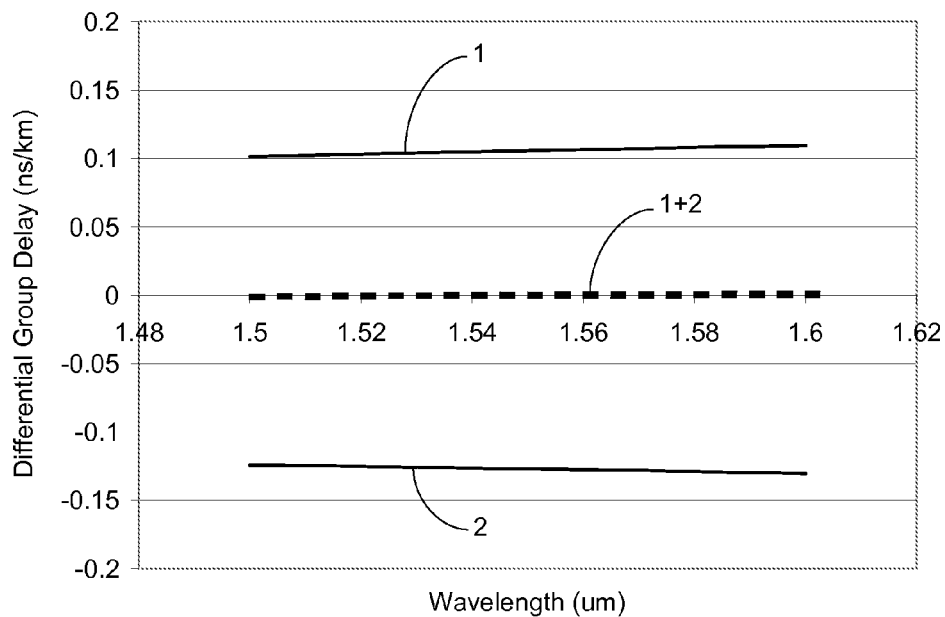
FIG. 5 plots differential mode group delays for two exemplary fibers and their combination.

Table 1 provides the refractive index profile parameters and relevant properties for two modeled exemplary optical fibers which may be combined to achieve differential mode group delay compensation. In particular, set forth below for each fiber is core delta percent, core radius in microns, core alpha, LP02 theoretical cutoff wavelength, LP11 theoretical cutoff wavelength, LP01 and LP11 dispersion at 1550 nm, effective area at 1550 nm, mode field diameter at 1550 nm, and slope of the differential mode group delay over the wavelength range 1530-1570 nm. The differential mode group delays of the two fibers as a function of wavelength are plotted in FIG. 5. The two fibers have opposite delays and delay slopes. By choosing the fiber length ratio of 1.2:1 for the two fibers, a fiber link with nearly zero delay can be constructed. For example, combining 480 km of Example 1 fiber with 400 km of Example 2 fiber results in the net delay plotted in FIG. 5. The net differential mode group delay for every wavelength over the entire wavelength range between 1.5 to 1.6 µm is less than 0.5 ps/km and the absolute value of the differential mode group delay slope is less than 0.5 ps/nm/km.

TABLE 1

| Exemplary Fiber | 1 | 2 |
|---|---|---|
| Δ1 % | 0.5 | 0.5 |
| R1 (µm) | 16.5 | 16.5 |
| Alpha | 2.2 | 1.8 |
| Theoretical LP02 Cutoff (µm) | 2.956 | 2.851 |
| Theoretical LP11 Cutoff (µm) | 4.178 | 3.976 |
| LP01 Dispersion (ps/nm/km) | 21.2 | 20.9 |
| LP01 Effective Area (µm²) | 185.9 | 168.4 |
| LP01 MFD (µm) | 15.3 | 14.7 |
| LP11 Dispersion (ps/nm/km) | 21.4 | 20.8 |
| LP11 Effective Area (µm²) | 241.8 | 234.2 |
| LP11-LP01 Delay at 1500 (ns/km) | 0.1012 | −0.1243 |
| LP11-LP01 Delay at 1550 (ns/km) | 0.1057 | −0.1269 |
| LP11-LP01 Delay at 1600 (ns/km) | 0.1094 | −0.1304 |
| LP11-LP01 Delay Slope at 1550 nm (ps/nm/km) | 0.06123 | −0.04363 |

Figure 6:
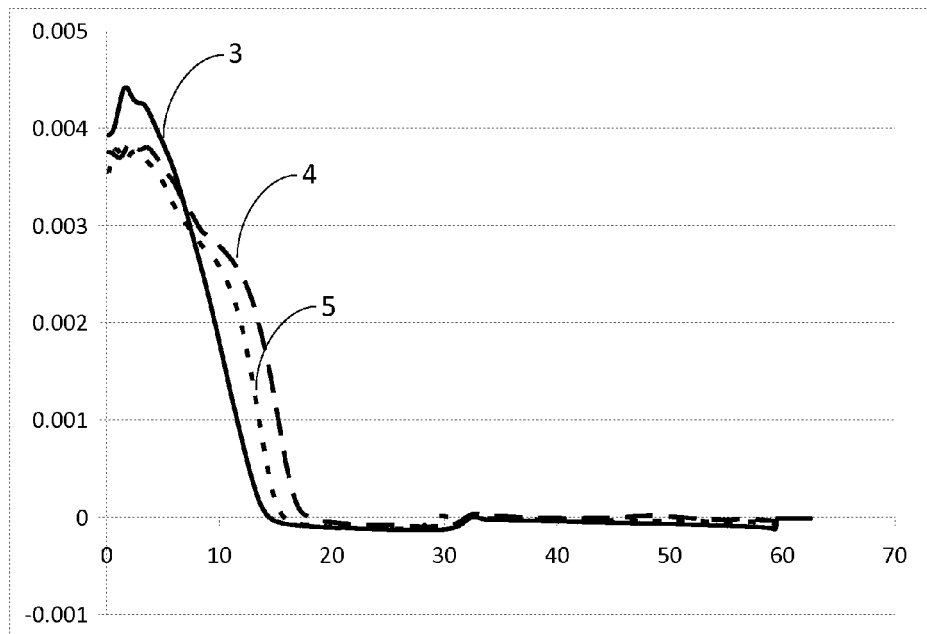
FIG. 6 illustrates the refractive index profiles of several exemplary optical fibers.
Figure 7:
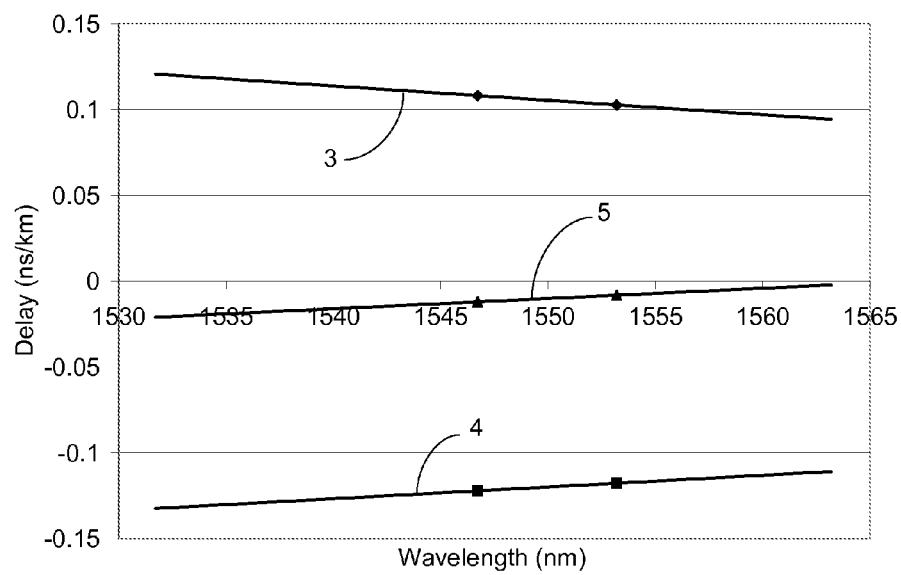
FIG. 7 illustrates the mode delays for the fibers illustrated in FIG. 6.
Figure 8:
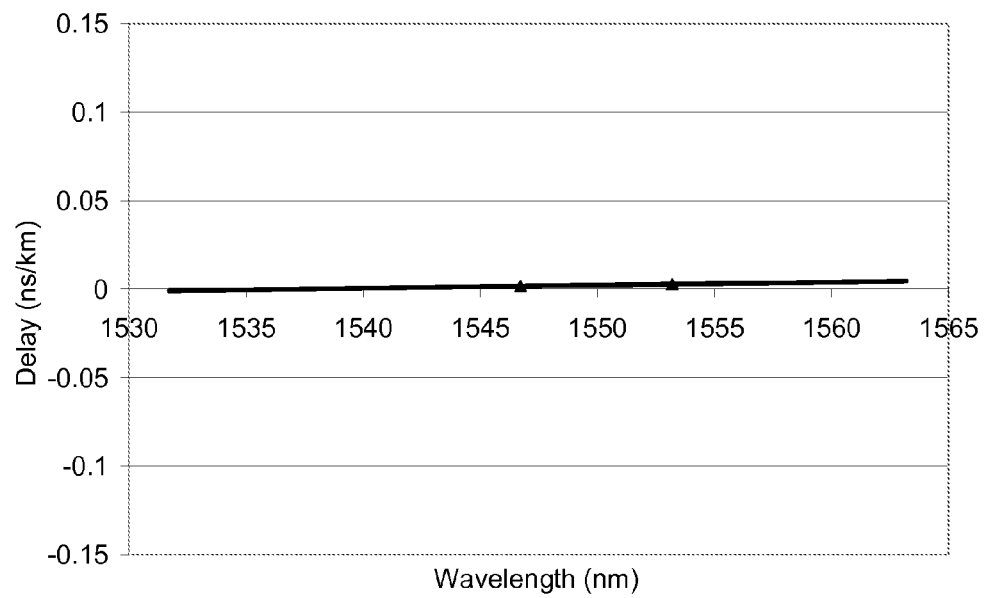
FIG. 8 illustrates the delay compensation effect possible by combining the fibers in FIGS. 6 and 7.

FIG. 6 illustrates the refractive index profiles of three actual drawn optical fibers (Examples 3-5) which may be combined to achieve differential mode group delay compensation. The refractive index profile parameters and relevant properties for the three exemplary optical fibers illustrated in FIG. 6 and are listed in Table 2 below. In particular, set forth below for each fiber is core delta percent, core radius in microns, core alpha, LP02 cutoff wavelength, LP11 cutoff wavelength, LP01 and LP11 dispersion at 1550 nm, effective area at 1550 nm, mode field diameter at 1550 nm, and slope of the differential mode group delay over the wavelength range 1530-1570 nm. FIG. 7 shows the measured differential mode group delays for the three fibers. Exemplary Fiber 3 has positive differential mode group delay with negative differential mode group delay slope, and Exemplary Fibers 4 and Fiber 5 have negative differential mode group delays and positive differential mode group delay slopes. FIG. 7 shows the net differential mode group delay of a 104 km long optical fiber link consisting of 32.5 km of Exemplary Fiber 3+22.5 km of Exemplary Fiber 4+49 km of Exemplary Fiber 5. The net delay is less than 3 ps/km at all wavelengths in the range between 1530 nm and 1570 nm.

TABLE 2

| Example | 3 | 4 | 5 |
|---|---|---|---|
| R1 (µm) | 13.7 | 15.3 | 17.5 |
| Δ1 (%) | 0.45 | 0.38 | 0.37 |
| Alpha | 1.88 | 2.52 | 2.68 |
| LP02 Cutoff (µm) | 2.038 | 2.851 | 2.3027 |
| LP11 Cutoff (µm) | 3.068 | 2.578 | 3.4759 |
| LP01 Dispersion (ps/nm/km) | 21.1 | 21.0 | 21.2 |
| LP01 Effective Area (µm²) | 151.0 | 226.7 | 204.9 |
| LP01 MFD (µm) | 13.8 | 17.1 | 16.2 |
| LP11 Dispersion (ps/nm/km) | 20.1 | 21.7 | 21.6 |
| LP11 Effective Area (µm²) | 200.0 | 319.8 | 280 |
| LP01-LP11 Delay at 1500 (ns/km) | 0.1473 | −0.1541 | −0.0406 |
| LP01-LP11 Delay at 1550 (ns/km) | 0.1056 | −0.1198 | −0.107 |
| LP01-LP11 Delay at 1600 (ns/km) | 0.0639 | −0.0854 | −0.0192 |
| LP01-LP11 Delay Slope at 1550 nm (ps/nm/km) | 0.834 | −0.686 | −0.598 |

In the embodiments shown and described herein, core 20 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The LP01 effective area $A_{eff}$ of fibers 1-5 may be between 120 and 260 $\mu m^2$, more preferably between 140 and 240 $\mu m^2$. In an example, the theoretical cutoff wavelength of the LP02 mode is less than 3000 nm, in another example is less than 2400 nm and in another example is less than 2100 nm. In these examples, the cabled cutoff wavelength of the LP02 mode is approximately 300 nm lower than the theoretical cutoff wavelength of the LP02 mode. In an example, the theoretical cutoff wavelength of the LP11 mode is greater than 2000 nm, in another example is greater than 2400 nm and in another example is greater than 2800 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

Table 3 illustrates the attributes of five index profiles for which variations of the radius and alpha parameter of the core change the sign of the differential mode group delay and differential mode group delay slopes. In example 6, the trench is adjacent to the graded index core, but is spaced from the core in examples 7-10 by an offset $R_2-R_1$. The refractive index profile for Example 9c is plotted in FIG. 9. Each of embodiments 6-10 yields very low differential mode delays when made according to the prescribed dimensions. The LP01 effective area $A_{eff}$ of fibers 6-10 is greater than 120 $\mu m^2$, more preferably between 120 and 200 $\mu m^2$. In an example, the theoretical cutoff wavelength of the LP02 mode is less than 2400 nm, in another example is less than 2000 nm and in another example is less than 1800 nm. In these examples, the cabled cutoff wavelength of the LP02 mode is approximately 300 nm lower than the theoretical cutoff wavelength of the LP02 mode. In an example, the theoretical cutoff wavelength of the LP11 mode is greater than 2000 nm, in another example is greater than 2200 nm and in another example is greater than 2400 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 3

| Example | 6 | 7 | 8 | 9 | 10 |
| --- | --- | --- | --- | --- | --- |
| Δ1 (%) | 0.46 | 0.46 | 0.46 | 0.46 | 0.46 |
| R1 (μm) | 11.1 | 11.1 | 11.1 | 11.1 | 11.1 |
| Alpha | 1.96 | 2.005 | 2.02 | 2.04 | 2.06 |
| R2 (μm) | 11.18 | 11.98 | 12.41 | 12.98 | 13.39 |
| Δ2 (%) | −0.15 | −0.2 | −0.25 | −0.35 | −0.45 |
| R3 (μm) | 17 | 17 | 17 | 17 | 18 |
| R1/R2 | 0.99 | 0.93 | 0.89 | 0.86 | 0.83 |
| Theoretical LP02 Cutoff (μm) | 1.591 | 1.609 | 1.613 | 1.620 | 1.626 |
| Theoretical LP11 Cutoff (μm) | 2.420 | 2.440 | 2.441 | 2.443 | 2.447 |

TABLE 3-continued

| Example | 6 | 7 | 8 | 9 | 10 |
| --- | --- | --- | --- | --- | --- |
| LP01 Dispersion (ps/nm/km) | 21.12 | 21.10 | 21.10 | 21.09 | 21.09 |
| LP01 Effective Area (μm²) | 123.4 | 124.5 | 124.9 | 125.3 | 125.8 |
| LP01 MFD (μm) | 12.53 | 12.59 | 12.61 | 12.63 | 12.65 |
| LP11 Dispersion (ps/nm/km) | 21.06 | 21.08 | 21.11 | 21.12 | 21.11 |
| LP11 Effective Area (μm²) | 123.8 | 125.0 | 125.4 | 125.9 | 126.2 |
| LP01-LP02 delay at 1530 (ns/km) | 0.0106 | 0.0032 | −0.0022 | −0.0055 | 0.0011 |
| LP01-LP02 delay at 1550 (nm/km) | 0.0107 | 0.0032 | −0.002 | −0.0053 | 0.0011 |
| LP01-LP02 delay at 1565 (nm/km) | 0.0103 | 0.0029 | −0.002 | −0.0053 | 0.0012 |
| LP01-LP02 delay slope at (ps/nm/km) | −0.009 | −0.009 | 0.006 | 0.006 | 0.003 |

Figure 9:
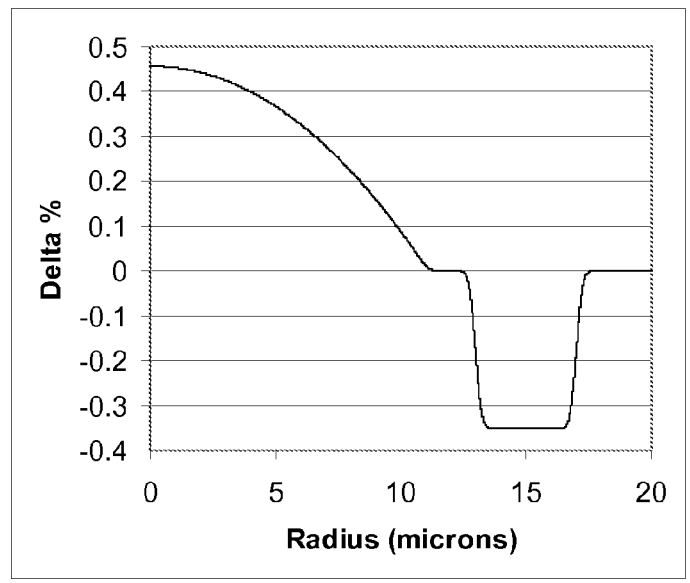
FIG. 9 illustrates a refractive index profile of an alternative few moded fiber

Table 4 illustrates the index profiles for four variations of Example 9 in which variations of the radius and alpha parameter of the core change the sign of the differential mode group delay and differential mode group delay slopes. FIG. 9 illustrates the refractive index profile of Example 9c. Each of embodiments 9a-9d yields very low differential mode delays when made according to the prescribed dimensions. Examples 9a and 9d have similar alpha values, with $|\alpha_i - \alpha_j| < 0.2$, and slightly different core radii with $|R_{1,i} - R_{1,j}| > 0.2$ μm. Example 9a yields negative differential mode delays at 1530, 1550 and 1565 nm, with a negative differential mode delay slope, while Example 9a yields positive differential mode delays at 1530, 1550 and 1565 nm, with a positive differential mode delay slope. Combining these two modeled fiber examples in approximately a 1:1 length ratio yields a span with nearly zero differential mode delay and differential mode delay slope. Example 9b yields positive differential mode delays at 1530, 1550 and 1565 nm, with a negative differential mode delay slope, while Example 9c yields negative differential mode delays at 1530, 1550 and 1565 nm, with a positive differential mode delay slope. Combining these two modeled fiber examples in approximately a 1:1 length ratio yields a span with nearly zero differential mode delay and differential mode delay slope.

TABLE 4

| Example | 9a | 9b | 9c | 9d |
| --- | --- | --- | --- | --- |
| Δ1 (%) | 0.456 | 0.465 | 0.465 | 0.466 |
| R1 (μm) | 11.01 | 11.16 | 10.89 | 11.23 |
| Alpha | 2.026 | 2.095 | 1.991 | 2.038 |
| R2 (μm) | 13.51 | 13.25 | 12.45 | 12.48 |
| Δ2 (%) | −0.35 | −0.35 | −0.35 | −0.35 |
| R3 (μm) | 17 | 17 | 17 | 17 |
| R1/R2 | 0.815 | 0.842 | 0.875 | 0.900 |
| LP02 Cutoff (μm) | 1.614 | 1.653 | 1.689 | 1.628 |
| LP11 Cutoff (μm) | 2.436 | 2.499 | 2.544 | 2.453 |
| LP01 Dispersion (ps/nm/km) | 21.01 | 21.11 | 21.22 | 21.17 |

TABLE 4-continued

| Example | 9a | 9b | 9c | 9d |
|---|---|---|---|---|
| LP01 Effective Area (μm²) | 124.9 | 126.3 | 131.8 | 125.8 |
| LP01 MFD (μm) | 12.62 | 12.67 | 12.94 | 12.64 |

TABLE 4-continued

| Example | 9a | 9b | 9c | 9d |
|---|---|---|---|---|
| LP11 Dispersion (ps/nm/km) | 20.81 | 21.05 | 21.73 | 21.44 |
| LP11 Effective Area (μm²) | 126.8 | 126.2 | 130.4 | 125.1 |
| LP01-LP02 delay at 1530 (ns/km) | −0.137 | 0.050 | −0.029 | 0.121 |
| LP01-LP02 delay at 1550 (nm/km) | −0.144 | 0.048 | −0.026 | 0.129 |
| LP01-LP02 delay at 1565 (nm/km) | −0.137 | 0.050 | −0.029 | 0.121 |
| LP01-LP02 delay slope at (ps/nm/km) | −0.0004 | −0.0001 | 0.0002 | 0.0004 |

Table 5 illustrates the attributes of an additional six index profiles for which variations of the radius and alpha parameter of the core change the sign of the differential mode group delay and differential mode group delay slopes. In embodiments 11-16, the trench is spaced from the core by an offset R2–R1. Each of embodiments 11-16 yields very low differential mode delays when made according to the prescribed dimensions. The LP01 effective area Aeff of fibers 6-10 is greater than 120 μm2, more preferably between 120 and 200 μm2. In an example, the theoretical cutoff wavelength of the LP02 mode is less than 2400 nm, in another example is less than 2000 nm and in another example is less than 1800 nm. In these examples, the cabled cutoff wavelength of the LP02 mode is approximately 300 nm lower than the theoretical cutoff wavelength of the LP02 mode. In an example, the theoretical cutoff wavelength of the LP11 mode is greater than 2000 nm, in another example is greater than 2200 nm and in another example is greater than 2400 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 5

| Example | 11 | 12 | 13 | 14 | 15 | 16 |
|---|---|---|---|---|---|---|
| Δ1 (%) | 0.477 | 0.436 | 0.455 | 0.466 | 0.463 | 0.454 |
| R1 (μm) | 10.94 | 11.04 | 11.39 | 10.79 | 11.10 | 11.02 |
| Alpha | 2.021 | 2.036 | 2.020 | 2.028 | 2.045 | 2.030 |
| R2 (μm) | 12.34 | 12.73 | 12.92 | 12.46 | 12.77 | 12.78 |
| Δ2 (%) | −0.30 | −0.30 | −0.28 | −0.33 | −0.32 | −0.32 |
| R3 (μm) | 17 | 17 | 17 | 17 | 17 | 17 |
| R1/R2 | 0.887 | 0.867 | 0.882 | 0.866 | 0.869 | 0.862 |
| LP02 Cutoff (μm) | 1.618 | 1.568 | 1.648 | 1.582 | 1.625 | 1.597 |
| LP11 Cutoff (μm) | 2.441 | 2.364 | 2.494 | 2.383 | 2.454 | 2.408 |
| LP01 Dispersion (ps/nm/km) | 21.08 | 21.14 | 21.10 | 21.08 | 21.10 | 21.10 |
| LP01 Effective Area (μm²) | 120.8 | 128.0 | 128.9 | 120.8 | 124.6 | 125.1 |
| LP01 MFD (μm) | 12.40 | 12.77 | 12.81 | 12.40 | 12.59 | 12.62 |
| LP11 Dispersion (ps/nm/km) | 21.17 | 21.15 | 21.14 | 21.14 | 21.15 | 21.12 |
| LP11 Effective Area (μm²) | 121.2 | 128.6 | 129.5 | 121.5 | 124.8 | 125.8 |
| LP01-LP02 delay at 1530 (ns/km) | 0.0135 | −0.004 | −0.0087 | −0.0126 | 0.0186 | −0.0197 |
| LP01-LP02 delay at 1550 (nm/km) | 0.0155 | −0.0038 | −0.0083 | −0.012 | 0.0193 | −0.0198 |
| LP01-LP02 delay at 1565 (nm/km) | 0.017 | −0.0037 | −0.0081 | −0.0115 | 0.0197 | −0.02 |
| LP01-LP02 delay slope at (ps/nm/km) | 0.01 | 0.0086 | 0.017 | 0.031 | 0.031 | −0.009 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber link, comprising:
   a first few-moded optical fiber having a core which supports the propagation and transmission of optical signals in the LP01 and LP11 modes at a wavelength of 1550 nm, said few-moded optical fiber having a positive differential mode group delay between the LP01 and LP11 modes at a wavelength between 1530-1570; and
   a second few-moded optical fiber having a core which supports the propagation and transmission of optical signals in the LP01 and LP11 modes at a wavelength of 1550 nm, said few-moded optical fiber having a negative differential mode group delay between the LP01 and LP11 modes at a wavelength between 1530-1570.

2. The optical fiber link of claim 1, wherein the lengths of the first and second fibers are selected to result in absolute value of differential group delay between the LP01 and LP11 modes over the link that is less than about 0.5 ns/km at a wavelength of 1550 nm.

3. The optical fiber link of claim 1, wherein, said first fiber comprises a positive differential group delay slope over the wavelength range of 1530 to 1570 nm, and said second fiber comprises a negative differential group delay slope over the wavelength range of 1530 to 1570 nm.

4. The optical fiber link of claim 1, wherein, said first fiber comprises a negative differential group delay slope over the wavelength range of 1530 to 1570 nm, and said second fiber comprises a positive differential group delay slope over the wavelength range of 1530 to 1570 nm.

5. The optical fiber link of claim 1, wherein the lengths for each of said first and second fiber are selected to result in absolute value of differential group delay slope between the LP01 and LP11 modes over the link that is less than about 1.0 ps/nm/km over the wavelength range of 1530 to 1570 nm.

6. The optical fiber link of claim 1, wherein the lengths of each of said first and second fibers are selected to result in absolute value of differential group delay between the LP01 and LP11 modes over said link which is less than about 0.25 ns/kin at a wavelength of 1550 nm.

7. The optical fiber link of claim 1, wherein the lengths for each of said first and second fiber are selected to result in an absolute value of differential group delay between the LP01 and LP11 modes over the link that is less than about 0.1 ns/km at a wavelength of 1550 nm.

8. The optical fiber link of claim 1, wherein fiber is comprised of a graded index core refractive profile characterized by curvature $\alpha_1$, the second fiber is comprised of a graded index core refractive profile characterized by curvature $\alpha_2$, and $|\alpha_1-\alpha_2|>0.2$ and $\alpha_1$ and $\alpha_2$ are both between 1.5 and 3.0.

9. The optical fiber link of claim 5, wherein said first fiber is comprised of a graded index core refractive profile characterized by curvature $\alpha_1$, the second fiber is comprised of a graded index core refractive profile characterized by curvature $\alpha_2$, and $\alpha_1>2.0$, and $\alpha_2<2.0$.

10. The optical fiber link of claim 1, wherein said wherein the first fiber is comprised of a graded index core refractive profile characterized by curvature $\alpha_1$ and radius $R_1$, the second fiber is comprised of a graded index core refractive profile characterized by $\alpha_2$ and radius $R_2$, and $|\alpha_1-\alpha_2|<0.4$ and $|R_1+R_2|>0.1$ μm.

11. The optical fiber link of claim 10, wherein $|R_1-R_2|>0.2$ μm.

12. The optical fiber link of claim 1, wherein said first and second fibers comprise a glass core having a radius $R_1$ in the range from about 8 μm to about 20 μm, a graded refractive index profile with an alpha value greater than or equal to about 1.5 and less than about 3.0 at a wavelength of 1550 nm, a maximum relative refractive index $\Delta_{1MAX}$ in the range from about 0.3% to about 0.6% relative to a glass cladding, and an effective area at 1550 nm greater than about 120 μm$^2$ and less than about 240 μm$^2$;

the glass cladding surrounding the glass core; and wherein the glass core and glass cladding support the propagation and transmission of the LP01 modes and LP11 modes at one or more wavelengths greater than 1500 nm, and wherein the absolute value of the differential group delay between the LP01 and LP11 modes is less than about 0.5 ns/km at a wavelength of 1550 nm.

13. The optical fiber link of claim 12, wherein said first and second fibers comprise a absolute value of the differential group delay between the LP01 modes and the LP11 modes that is less than about 0.3 ns/km at a wavelength of 1550 nm.

14. The optical fiber link of claim 12, wherein said first and second fibers further comprise:

a cutoff wavelength for an LP02 mode that is less than 3000 nm; and a cutoff wavelength for the LP11 mode that is greater than 2400 nm.

15. The few optical fiber link of claim 12, wherein said first and second fibers further comprise a trench; wherein said trench comprises a radial thickness in the range from about 2 μm to about 10 μm.

* * * * *